US008646508B2

(12) United States Patent
Kawada

(10) Patent No.: US 8,646,508 B2
(45) Date of Patent: Feb. 11, 2014

(54) LABEL PEELING MACHINE

(75) Inventor: Toshikazu Kawada, Tokyo (JP)

(73) Assignee: Towa Seiko Co., Ltd., Tokyo (JP)

( * ) Notice: Subject to any disclaimer, the term of this patent is extended or adjusted under 35 U.S.C. 154(b) by 252 days.

(21) Appl. No.: 13/182,529

(22) Filed: Jul. 14, 2011

(65) Prior Publication Data

US 2012/0103527 A1 May 3, 2012

(30) Foreign Application Priority Data

Oct. 27, 2010 (JP) ................................ 2010-240600

(51) Int. Cl.
*B32B 38/10* (2006.01)

(52) U.S. Cl.
USPC ........... 156/759; 156/539; 156/715; 156/764; 156/766

(58) Field of Classification Search
USPC ......... 156/539, 540, 715, 716, 759, 764, 765, 156/766
See application file for complete search history.

(56) References Cited

U.S. PATENT DOCUMENTS

| | | | | | |
|---|---|---|---|---|---|
| 5,580,012 | A * | 12/1996 | Soltysiak | ...................... | 242/528 |
| 5,713,679 | A * | 2/1998 | Taylor | ...................... | 400/621 |
| 6,280,549 | B1 * | 8/2001 | Langan | ...................... | 156/152 |
| 2009/0145558 | A1 * | 6/2009 | Saluz | ...................... | 156/530 |
| 2012/0211173 | A1 * | 8/2012 | Fefin | ...................... | 156/714 |

FOREIGN PATENT DOCUMENTS

| | | |
|---|---|---|
| JP | 5-221437 | 8/1993 |
| JP | 2009-199042 | 9/2009 |

* cited by examiner

*Primary Examiner* — Mark A Osele
(74) *Attorney, Agent, or Firm* — Wenderoth, Lind & Ponack, L.L.P.

(57) ABSTRACT

A label peeling machine is configured to one by one peel adhesive labels of a non-liner label having a number of adhesive labels stuck continuously so as to be overlapped while being shifted by a predetermined width. The non-liner label wound and held on a reel is placed on a carrier belt entrained about a first driven shaft, a second driven shaft, and a third driven shaft and is moved forward or backward. The label peeling machine includes a first sensor for causing the carrier belt to move backward, a second sensor for stopping the carrier belt, a peeling claw for engaging the non-liner label moving upward along the drive belt and peel the adhesive labels one by one, and a control apparatus configured to control a switch, the first sensor and the second sensor.

5 Claims, 9 Drawing Sheets

LABEL PEELING MACHINE

BACKGROUND OF THE INVENTION

1. Field of the Invention

The present invention relates to a label peeling machine and, more particularly, to a label peeling machine configured to peel adhesive labels of a non-liner label having a number of the adhesive labels stuck continuously so as to be overlapped while being shifted by a predetermined width respectively one by one without using a release coated paper.

2. Prior Art

As a peeling machine in the prior art, a configuration described below is known. This peeling machine is configured to bend a band-shaped release coated paper, on which adhesive labels are stuck, to an acute angle and peel the adhesive label from the release coated paper, then discharge the release coated paper from which the adhesive labels are peeled off out from the peeling machine, and is configured to have a discharging panel for guiding the release coated paper when discharging the same out from the peeling machine formed movably so that the direction of discharge of the release coated paper can be selected (see JP-A-5-221437).

The peeling machine in this configuration allows the direction of discharge of the release coated paper to be selected, and hence the release coated paper can be discharged to a position suitable for operation. It can also prevent such problem that the release coated paper being discharged catches and drops other components.

In contrast, there is a known non-liner label of a type having a plurality of adhesive labels stuck continuously so as to be overlapped while being shifted by a predetermined width respectively without using a release coated paper (see JP-A-2009-199042).

The non-liner label as described above, which does not generate a release coated paper to be discarded, contributes to solving the waste problem, and is a product good for the environment.

In the peeling machine in the prior art, the release coated paper, after having peeled the adhesive label, ends up as waste, so that there is a problem that the request to reduce industrial waste cannot be dealt with.

The peeling machine in the prior art has a problem such that the above described non-liner label cannot be used because of its structure.

Therefore, the peeling machine in the prior art has a problem to be solved for reducing the industrial waste by devising the machine to support the non-liner label and eliminating the release coated paper which ends up as waste.

SUMMARY OF THE INVENTION

In order to solve the above-described problems, the invention provides a label peeling machine configured to peel adhesive labels of a non-liner label having a number of the adhesive labels stuck continuously so as to be overlapped while being shifted by a predetermined width respectively one by one, and including a reel configured to wind and hold the non-liner label, a carrier belt configured to transport the non-liner label, a drive motor configured to rotate a drive shaft to drive the carrier belt, a switch configured to drive to cause operation of the drive motor, a drive shaft configured to rotate in conjunction with the rotation of the drive motor, a first driven shaft configured to receive transmission of rotation of the drive shaft via a transmitting mechanism, a second driven shaft and a third driven shaft configured to receive transmission of the rotation of the first driven shaft via the carrier belt, a vertical press roller configured to press the non-liner label moving forward or backward along the carrier belt in the vertical direction, a horizontal press roller configured to press the non-liner label which moves downward or upward along the carrier belt in the horizontal direction, a first sensor configured to perform a first detection when the non-liner label has moved in the forward direction along the vertical portion of the belt path to reach a first predetermined position and to issue a first operation signal, a second sensor configured to perform a second detection when the non-liner label has moved in the backward direction along the vertical portion of the belt path to reach a second predetermined position and to issue a stop signal, a peeling claw configured to engage the non-liner label moving upward along the carrier belt and peel the adhesive label one by one, and a control device operably coupled to the drive motor, the switch, the first sensor, and the second sensor to reverse operation of the drive motor to cause movement of the non-liner label in the backward direction when the first sensor issued the operation signal, and to stop operation of the drive motor to stop movement of the non-liner label when the second sensor issues the stop signal.

Preferably, the carrier belt is formed into a substantially endless right-angled triangular shape including a horizontal portion from the third driven shaft to the first driven shaft and a vertical portion from the first driven shaft to the second driven shaft, the peeling claw includes a curved surface facing an outer periphery of a bent portion of the carrier belt bent in response to the first driven shaft at a lower end portion of the peeling claw and an edge portion at an acute angle formed at a distal end of the curved surface.

As the transmitting mechanism, a drive belt or a drive gear can be used. Preferably, a small roller configured to press the non-liner label which moves forward or backward along the carrier belt in the vertical direction and a reverse moving roller configured to rotate in contact with the small roller and guide the peeled adhesive label in the upward direction are provided in the vicinity of the peeling claw.

The first sensor and the second sensor include adjusters having adjusting bolts for adjusting positions thereof, respectively, so that the positions of the respective sensors can be adjusted corresponding to the difference in length of the adhesive label to be used.

According to the label peeling machine of the invention, the adhesive labels on the non-liner label can be peeled one by one. Therefore, by using the label peeling machine of the invention, the release coated paper to be discarded is not used in the adhesive label, so that the invention achieves superior effects that it contributes to solution of waste problem and is a product good for the environment.

By entraining the carrier belt substantially right-angled triangular shape and providing the peeling claw having a curved surface along the outer periphery of the bent portion in response to the first driven shaft as a right-angled portion and the edge portion at an acute angle at the distal end of the curved surface, the adhesive labels can be peeled off reliably from the non-liner label moving backward and upward one by one.

Also, by using the drive belt or the drive gear as the transmitting mechanism, the rotation of the drive shaft can be transmitted smoothly and reliably to the first driven shaft. In addition, with the provision of the small roller configured to press the non-liner label on the carrier belt vertically downward and the reverse moving roller configured to rotate in contact with the small roller in the vicinity of the peeling claw, the peeled adhesive label can be guided to move upward smoothly to be brought reliably into abutment with the second sensor.

With the provision of the adjuster in the first sensor and the second sensor, the positions of the respective sensors can be adjusted, so that usage of the adhesive labels having different lengths can be also supported. In other words, superior effect such that usage of the non-liner labels of adhesive label having various lengths can be set for use is achieved.

DESCRIPTION OF THE PREFERRED EMBODIMENTS

Figure 1:
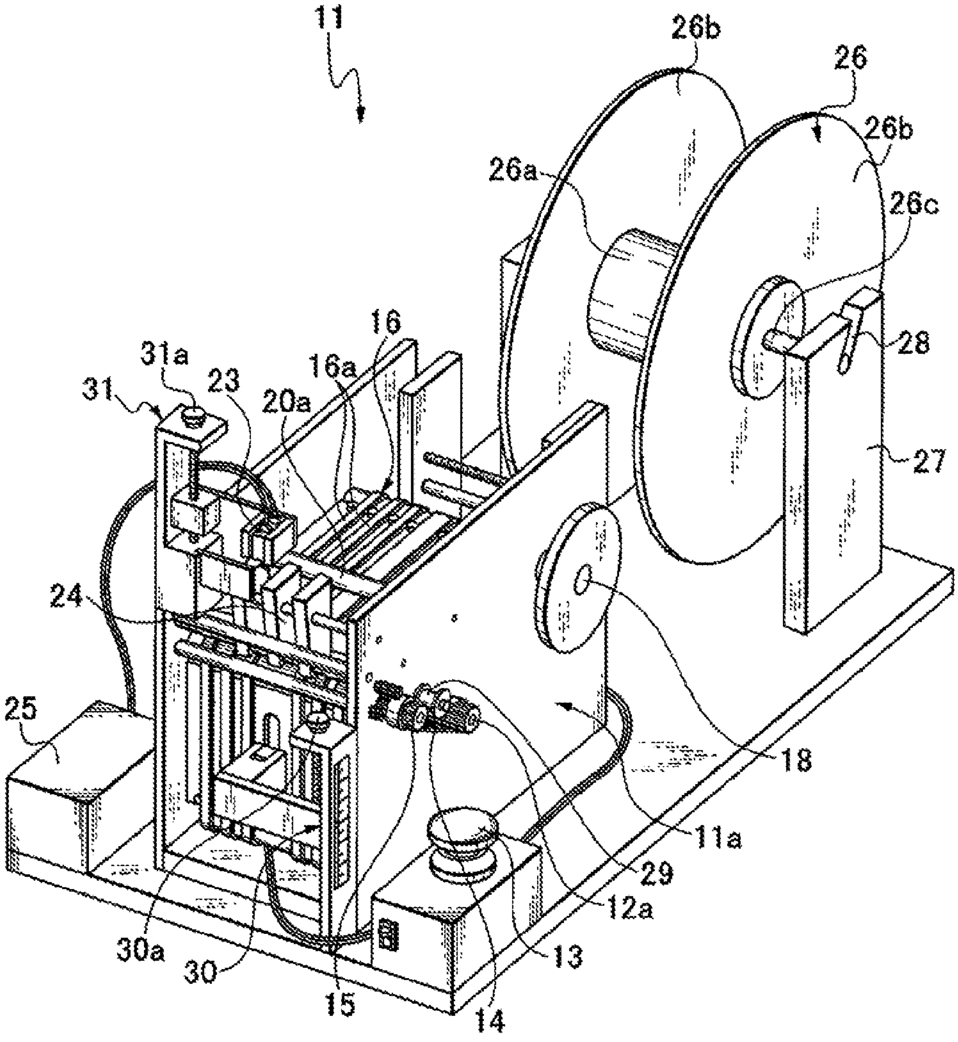
FIG. 1 is a perspective view showing a label peeling machine according to an embodiment of the invention.
Figure 2:
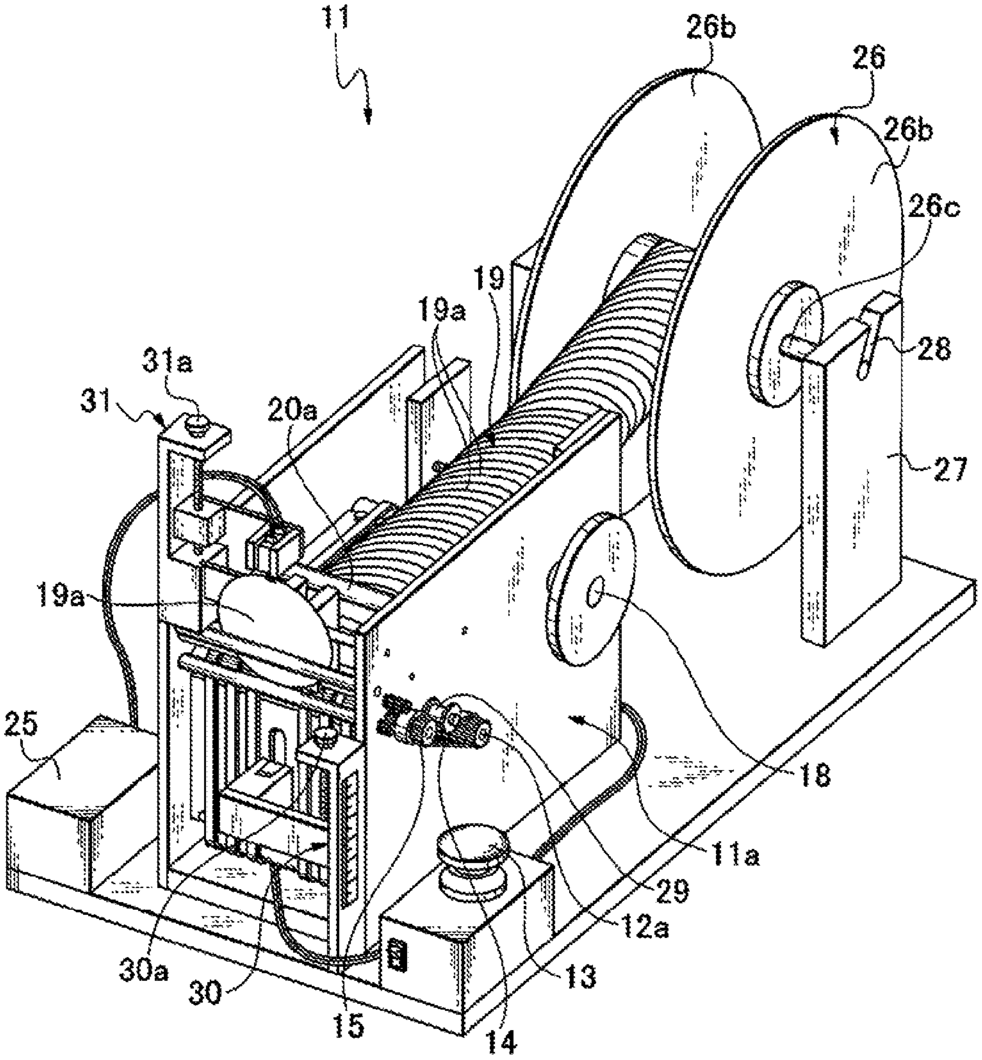
FIG. 2 is a perspective view showing a state in which a non-liner label is set in the same label peeling machine.
Figure 3:
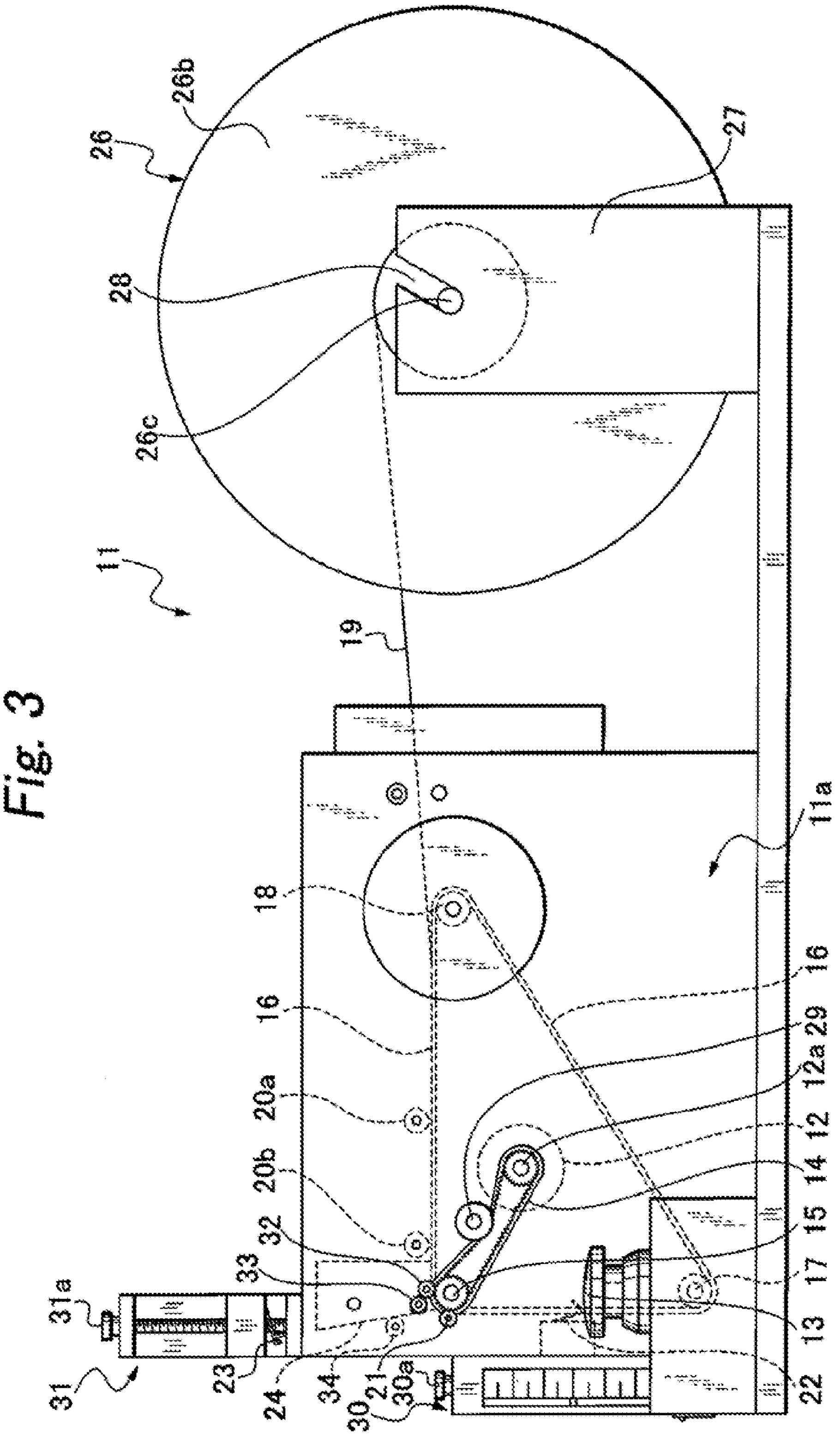
FIG. 3 is a side view showing the same label peeling machine.
Figure 4:
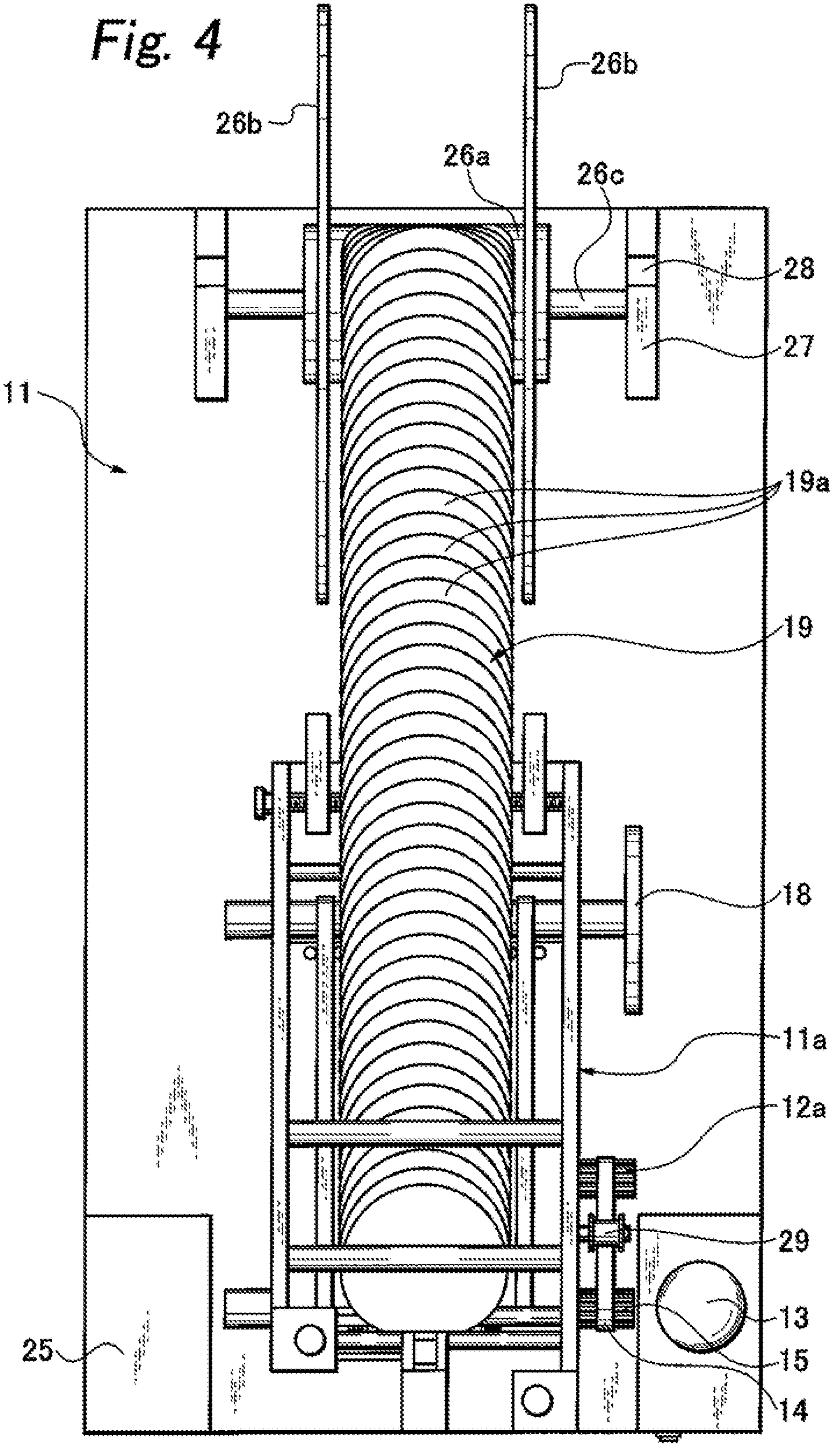
FIG. 4 is a plan view showing the state in which the non-liner label is set in the same label peeling machine.

Referring now to the drawings, a label peeling machine according to embodiments of the invention will be described below. As shown in FIGS. 1 to 3, a label peeling machine 11 is configured to peel adhesive labels of a non-liner label 19 having a number of the adhesive labels stuck continuously so as to be overlapped while being shifted by a predetermined width respectively one by one, and includes a reel 26 configured to wind and hold the non-liner label 19, a carrier belt 16 configured to transport the non-liner label 19, a drive motor 12 configured to drive the carrier belt 16, a switch 13 configured to cause driving of the drive motor 12, a drive shaft 12*a* configured to be rotated upon driving of the drive motor 12, a first driven shaft 15 configured to receive transmission of the rotation of the drive shaft 12*a* via a transmitting mechanism, a second driven shaft 17 and a third driven shaft 18 configured to receive transmission of the rotation of the first driven shaft via the carrier belt 16, a vertical press roller arrangement including vertical (first) press rollers 20*a* and 20*b* configured to press the non-liner label 19 moving forward or backward along the carrier belt 16 in a vertical direction (a first direction), a horizontal (second) press roller 21 configured to press the non-liner label 19 moving downward or upward along the carrier belt 16 in a horizontal direction (a second direction generally perpendicular to the first direction), a first micro switch 22 as a first sensor configured to cause reversal of the rotation of the drive motor 12 and to cause the carrier belt 16 to move backward, a second micro switch 23 as a second sensor configured to cause the rotation of the drive motor 12 and the carrier belt 16 to stop, a peeling claw 24 configured to engage the non-liner label 19 moving upward along the carrier belt 16 and peel adhesive labels 19*a* one by one, and a control device 25 configured to control the switch 13, the first sensor, and the second sensor.

The carrier belt 16 includes a plurality of rubber belts 16*a* arranged in parallel, is entrained about the first to third driven shafts 15, 17, and 18, and is formed into a substantially endless right-angled triangular shape including a horizontal portion from the third driven shaft 18 to the first driven shaft 15, and a vertical portion from the first driven shaft 15 to the second driven shaft 17, as shown in FIG. 3.

As shown in FIGS. 1 and 3, the reel 26 includes a cylindrical body portion 26*a*, disk portions 26*b* provided at both ends of the body portion 26*a*, and a shaft portion 26*c* provided at the centers of the disk portions 26*b*, and the shaft portion 26*c* is rotatably inserted into and engaged with a groove portion 28 formed on a supporting panel 27.

The first driven shaft 15 among the first to third driven shafts 15, 17, and 18 that hold the carrier belt 16 tight is coupled to the drive shaft 12*a*, which is directly coupled to the drive motor 12, via a drive belt 14. Therefore, simultaneously with the rotation of the drive shaft 12*a* by the drive motor 12, which is transmitted to the first driven shaft 15 via the drive belt 14, the rotation of the first driven shaft 15 causes the carrier belt 16 to rotate, and the second and third driven shafts 17 and 18 rotate in conjunction therewith.

A tension roller 29 for providing tension to the drive belt 14 is provided in between the drive shaft 12*a* and the first driven shaft 15. The first vertical press roller 20*a* and the second vertical press roller 20*b* are configured to press the non-liner label 19, which moves forward or backward on the carrier belt 16, vertically downward by a suitable pressing force and are arranged between the first driven shaft 15 and the third driven shaft 18. Furthermore, in the vicinity of the first driven shaft 15 are disposed a horizontal press roller 21 that is configured to press the non-liner label 19, which moves downward or upward along the carrier belt 16 in the horizontal direction, by a suitable pressing force, and a small roller 32 that is configured to press the non-liner label 19 in the vertical direction. A reverse moving roller 33 is provided at a position in contact with the small roller 32, and the reverse moving roller 33 rotates in the direction opposite from the small roller 32. A configuration in which a drive gear is employed instead of the drive belt 14 may be employed.

The first micro switch 22 is arranged at an intermediate position of the vertical portion of the carrier belt 16 where the distal end portion of the non-liner label 19 can come into abutment with as shown in FIG. 3. The position of the first micro switch 22 is provided so as to be freely adjustable by an adjuster 30. As shown in FIGS. 1 to 3, the adjuster 30 includes an adjuster bolt installed so as to be rotatable by an adjusting tab 30*a* at a head portion and a piece member screwed so as to be movable upward and downward, and the first micro switch 22 is mounted to the piece member. When a different type of the non-liner label 19 is set, the position of the first micro switch 22 can be adjusted by rotating the adjusting tab 30*a* of the adjuster 30 according to the difference in length of the adhesive label 19*a*. Therefore, the non-liner label 19 having various lengths of the adhesive label 19*a* can be supported.

All of the switch 13, the first micro switch 22, and the second micro switch 23 are electrically connected to the drive motor 12 via the control device 25. When the switch 13 is turned on, an operation signal is emitted, and the drive motor 12 rotates drive shaft 12*a* in the normal direction. When the non-liner label 19 is placed on the carrier belt 16 and moves forward and moves downward (along a first path portion of a path of the carrier belt) after having passed the first driven shaft 15, and the distal end portion comes into abutment with the first micro switch 22, the switch is turned on and an operation signal is emitted, and the operation signal causes the drive motor 12 to rotate the drive shaft 12*a* in the reverse direction. With this reverse rotation, the drive shaft 12*a* moves the carrier belt 16 in the backward direction.

When the drive motor 12 rotates the drive shaft 12*a* in the reverse direction and the carrier belt 16 is moved in the backward direction, the adhesive labels 19*a* are peeled off from the non-liner label 19 by the peeling claw 24 one by one. In other words, the peeling claw 24 is arranged in the vicinity of the first driven shaft 15, that is, in the vicinity of a bent portion 16*b* of the carrier belt 16. The peeling claw 24 has a curved surface along the outer periphery of the bent portion 16*b* of the carrier belt 16 curved in response to the first driven shaft 15 and is formed with an edge portion 24*a* at an acute angle at a distal end of the curved surface at a lower end portion thereof. The curved surface at the lower end portion of the peeling claw 24 causes the non-liner label 19 moving forward along the carrier belt 16 to bend by approximately 90° and guides the same in the downward direction. Then, when the carrier belt 16 is moved backward by the reverse rotation of the drive motor 12, the edge portion 24*a* of the peeling claw 24 engages the non-liner label 19 which moves upward, and peels one of the adhesive labels 19*a* located at the end of the non-liner label 19. It is needless to say that the position of the peeling claw 24 is adjusted in advance so that the distal end portion 24*a* can peel the adhesive labels 19*a* one by one.

When the peeled adhesive label 19*a* is moved upward (in the backward direction along the first path portion of the carrier belt path) and the distal end portion comes into abutment with the second micro switch 23, the switch is turned on and a stop signal is emitted to the control device 25, and the stop signal stops the drive motor 12. By stopping the drive motor 12, the rotation of the drive shaft 12*a* is stopped and the carrier belt 16 is stopped.

The second micro switch 23 is provided so that the position thereof can be adjusted freely by an adjuster 31 in the same manner as the first micro switch 22. As shown in FIGS. 1 to 3, the adjuster 30 includes an adjuster bolt installed so as to be rotatable by an adjusting tab 31*a* at a head portion and a piece member screwed so as to be movable upward and downward, and the second micro switch 23 is mounted to the piece member. When a different type of the non-liner label 19 is set, the position of the first micro switch 22 is adjusted by rotating the adjusting tab 31*a* of the adjuster 31 according to the difference in length of the adhesive label 19*a*.

Figure 5:
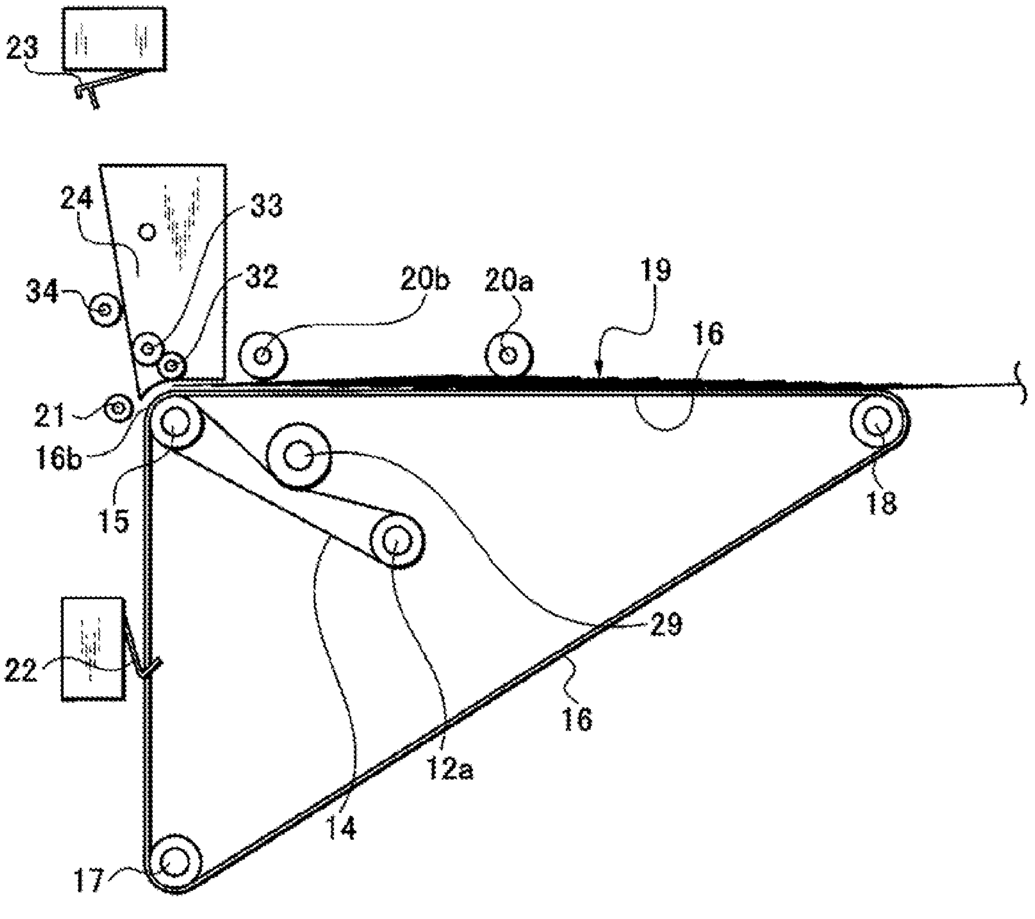
FIG. 5 is a side view showing a linear state before a distal end portion of the non-liner label is bent on a carrier belt of the same label peeling machine.
Figure 8:
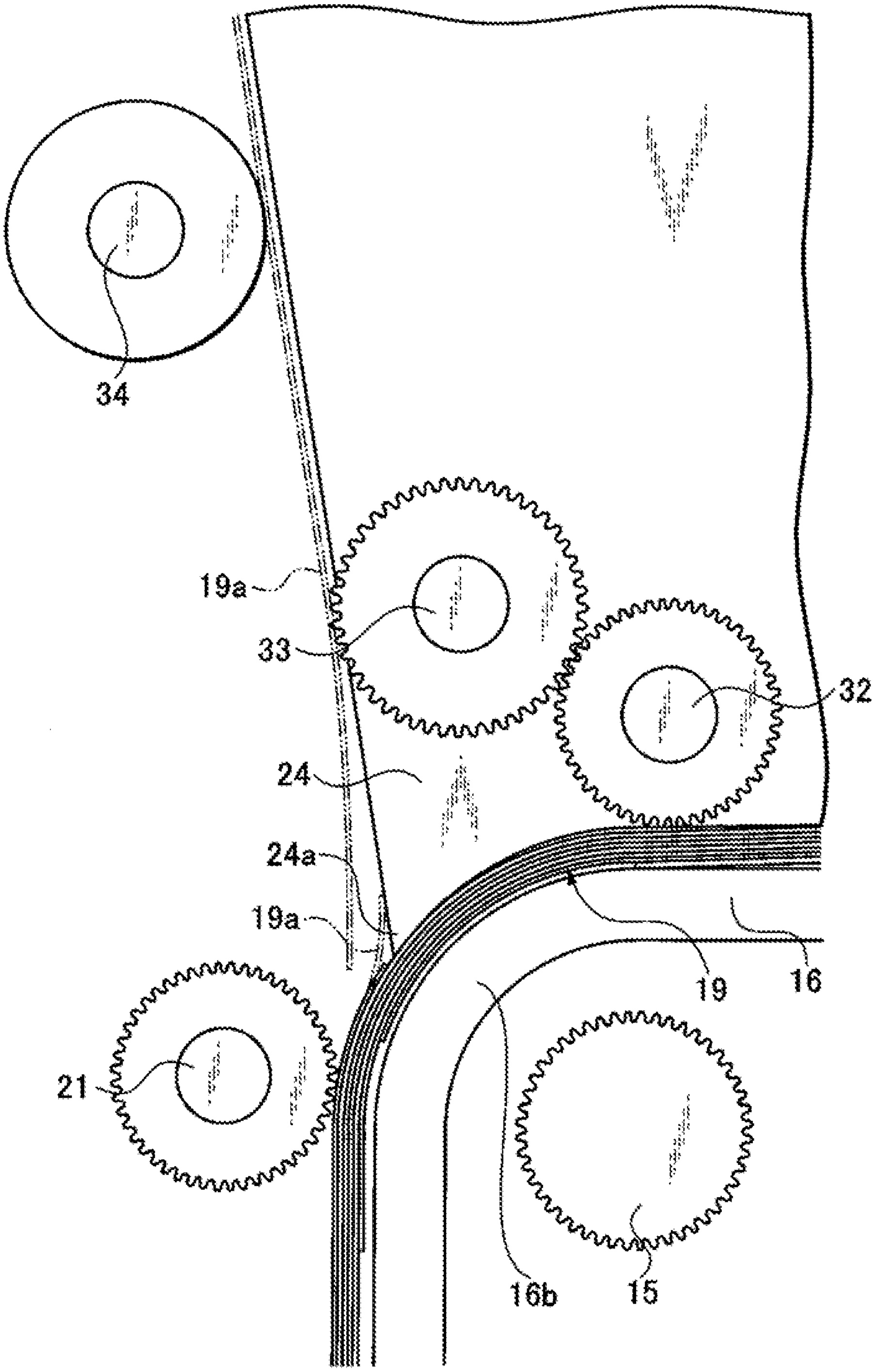
FIG. 8 is a side view of a principal portion showing a state in which a peeling claw peels an adhesive label in the same label peeling machine.

As shown in FIGS. 3, 5, and 8, the small roller 32, configured to press the non-liner label 19 in the vertical direction, is arranged in the vicinity of the peeling claw 24. Also, the reverse moving roller 33 is arranged in contact with the small roller 32, and the reverse moving roller 33 rotates in the direction opposite from the small roller 32. The reverse moving roller 33 plays a role to guide the peeled adhesive label 19*a* in the upward direction and cause the same to move upward smoothly, and to bring the same into reliable abutment with the second micro switch 23.

As shown in FIG. 8, provided above the reverse moving roller 33 are a first holding roller 34 and a second holding roller (not shown) positioned inside the first holding roller 34, which hold the adhesive label 19*a* moved upward and prevent the adhesive label 19*a* coming into abutment with the second micro switch 23 from dropping on the floor.

The control device 25 is electrically connected to the switch 13, the first micro switch 22, the second micro switch 23, and the drive motor 12 as described above, and controls the drive motor 12 to drive in the normal (forward) direction, drive in the reverse (backward) direction, or stop.

Subsequently, the operation of the label peeling machine 11 configured as described above will be described. First of all, the non-liner label 19 is set on the carrier belt 16. Since adhesive agent is applied to a back surface of the non-liner label 19, it is placed on the carrier belt 16 with a suitable adhesive force.

When the drive motor 12 is rotated (in the normal direction) by pushing the switch 13, the carrier belt 16 moves forward and the non-liner label 19 moves forward along the carrier belt 16. The non-liner label 19 passes under the first vertical press roller 20*a* and the second vertical press roller 20*b*. In addition, when the non-liner label 19 passes the vicinity of the bent portion 16*b* of the carrier belt 16, the curved surface at the lower end portion of the peeling claw 24 causes the non-liner label 19 to bend by approximately 90° and guides the same in the downward direction (see FIG. 5).

Figure 6:
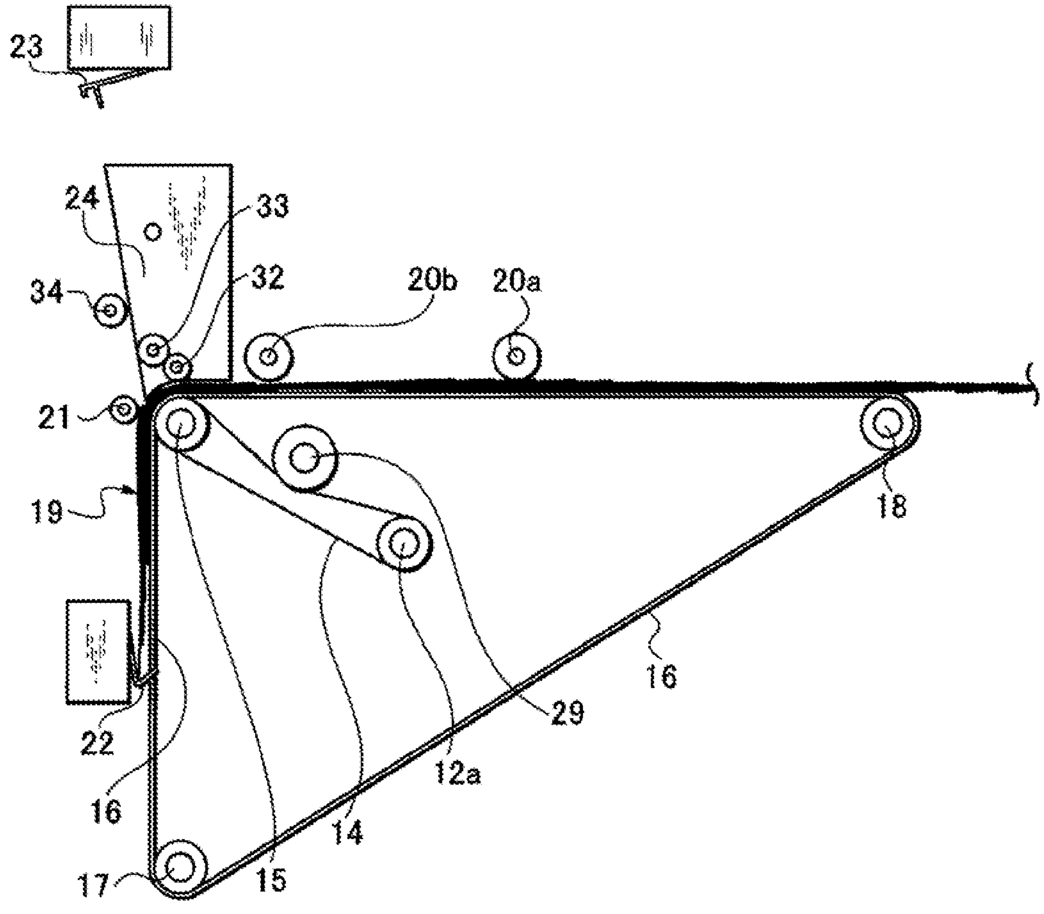
FIG. 6 is a side view showing a state in which the distal end portion of the non-liner label is bent and guided in the downward direction on the same carrier belt.
Figure 7:
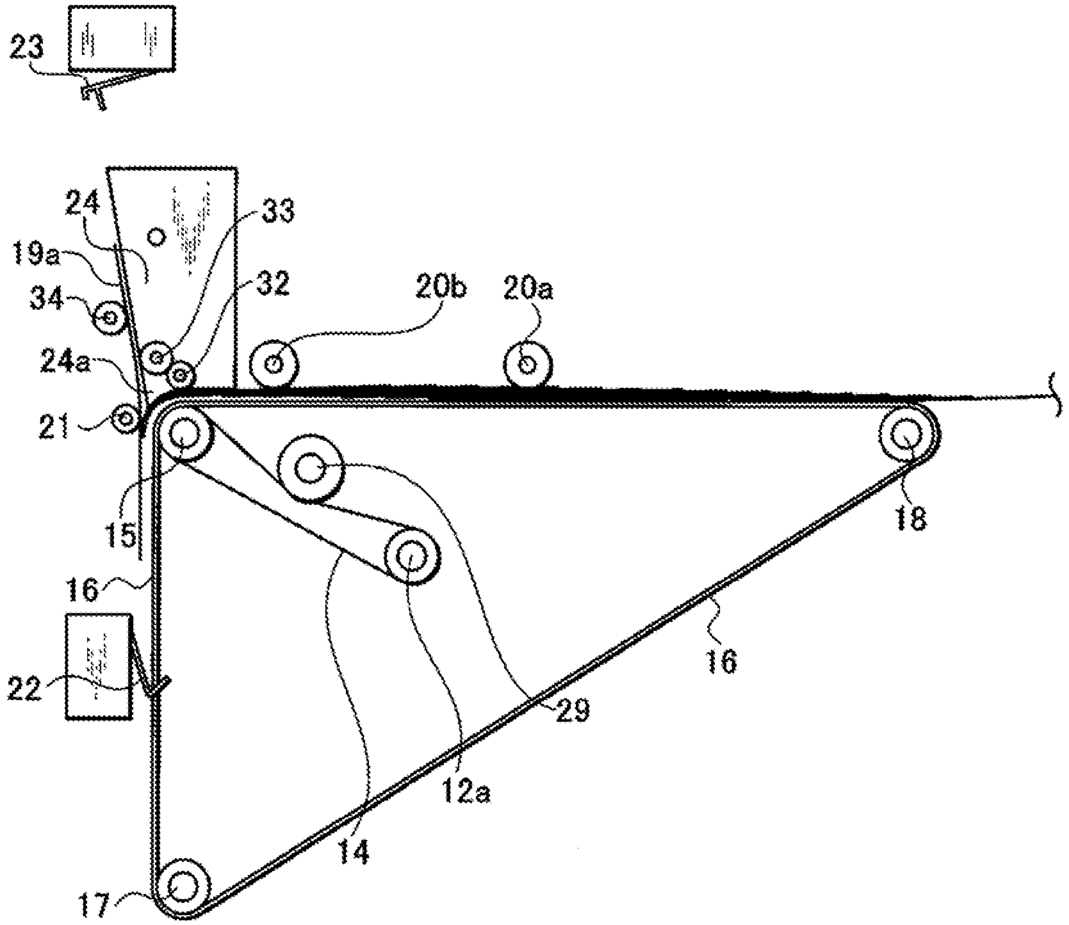
FIG. 7 is a side view showing a state in which the adhesive label is peeled from the non-liner label along a backward and upward movement path of the same carrier belt.

When the non-liner label 19 moves further downward, and the distal end portion of the non-liner label 19 comes into abutment with the first micro switch 22 and hence the first micro switch 22 is turned on, the drive motor 12 rotates the drive shaft 12*a* in the reverse direction as described above, and the carrier belt 16 is moved in the backward direction (upward direction) (see FIG. 6). When the non-liner label 19 moves backward (upward) along the carrier belt 16, the distal end portion 24*a* of the peeling claw 24 peels one of the adhesive labels 19*a* positioned at the end of the non-liner label 19 (see FIG. 7 and FIG. 8).

Figure 9:
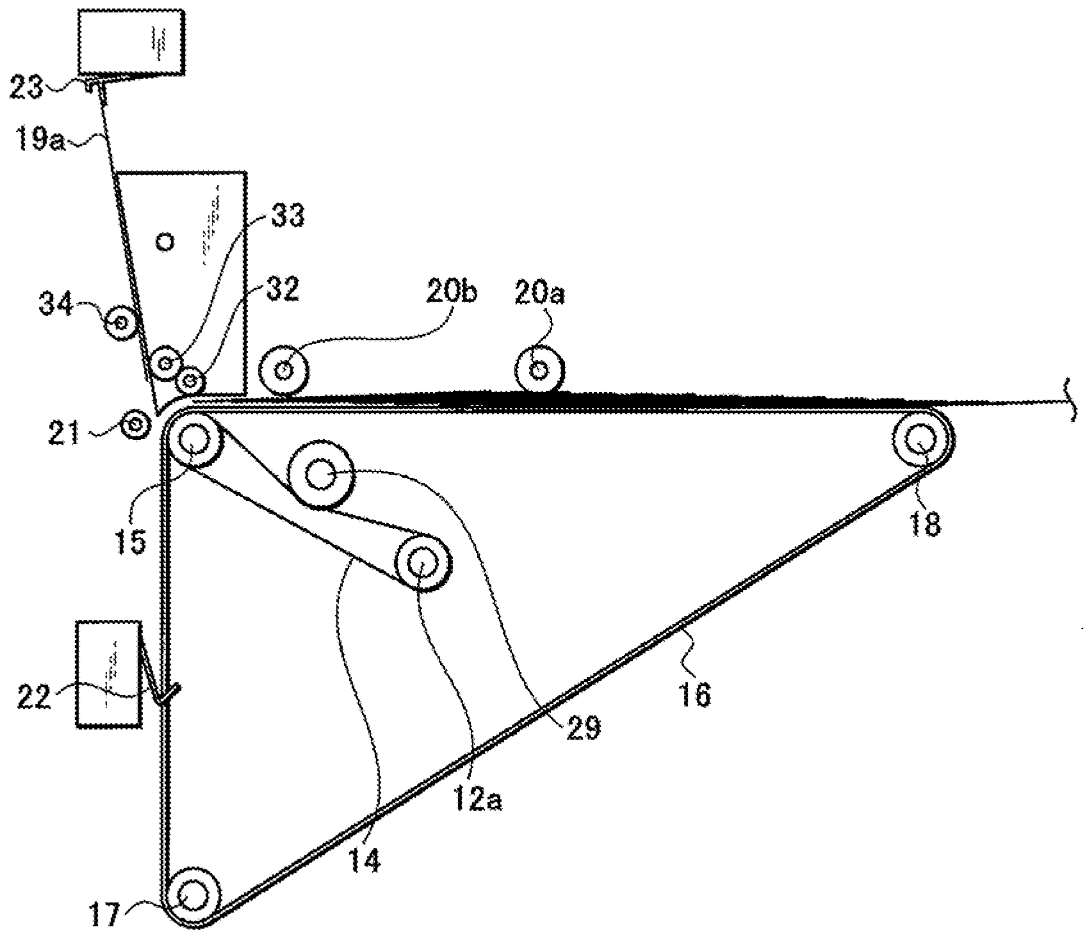
FIG. 9 is a side view showing a state in which the distal end portion of the separated non-liner label comes into abutment with a second micro switch.

The peeled adhesive label 19*a* is guided in the upward direction in association with the rotation of the reverse moving roller 33 in the upward direction. In addition, the adhesive label 19*a* passes between the first holding roller 34 and the second holding roller (not shown), and the distal end portion thereof comes into abutment with the second micro switch 23 (see FIG. 9). The adhesive label 19*a* is held between the first holding roller 34 and the second holding roller (see FIG. 7).

When the second micro switch 23 is turned on, as described above, the drive motor 12 is stopped and the carrier belt 16 is stopped as described above. The adhesive label 19*a* held between the first holding roller 34 and the second holding roller is taken out by hand and stuck to a predetermined article. When the switch 13 is pushed again, the label peeling machine 11 repeats the above-described operation.

As described above, the label peeling machine 11 according to the invention peels the adhesive labels 19*a* on the non-liner label 19 one by one. The release coated paper to be discarded as in the prior art is not discharged from the label peeling machine 11.

What is claimed is:

1. A label peeling machine configured to peel adhesive labels of a non-liner label web one by one, wherein the non-liner label web has a number of the adhesive labels stuck continuously so as to be overlapped while being shifted by a predetermined distance respectively, said label peeling machine comprising:

a reel configured to wind and hold the non-liner label web;

a carrier belt configured to transport the non-liner label web in forward and backward motions along a carrier belt path including a first path portion extending in a first direction and a second path portion extending in a second direction generally perpendicular to said first direction;

a rotatable drive shaft operably coupled with said carrier belt so that said carrier belt is driven when said drive shaft is rotated;

a drive motor configured to rotate the drive shaft to drive the carrier belt;

a switch configured to cause operation of the drive motor to rotate the drive shaft;

a first driven shaft configured to receive transmission of rotation of the drive shaft via a transmitting mechanism;

a second driven shaft and a third driven shaft configured to receive transmission of rotation of the first driven shaft via the carrier belt;

a first press roller configured to press, in the first direction, the non-liner label web as the non-liner label web moves in the second direction along the second path portion of the carrier belt path;

a second press roller configured to press, in the second direction, the non-liner label web as the non-liner label web moves in the first direction along the first path portion of the carrier belt path;

a first sensor configured to perform a first detection when the non-liner label web has moved in the forward motion along the first path portion of the carrier belt path to reach a first predetermined location, and to issue an operation signal to indicate said first direction;

a second sensor configured to perform a second detection when the non-liner label web has moved in the backward motion along the first path portion of the carrier belt path to reach a second predetermined location, and to issue a stop signal to indicate said second detection;

a peeling claw configured to engage the non-liner label web moving upward along the carrier belt and peel the adhesive labels one by one; and a control device operably coupled to the drive motor, the switch, the first sensor, and the second sensor to reverse operation of the drive motor to cause movement of the non-liner label web in the backward motion when the first sensor issues the operation signal, and to stop operation of the drive motor to stop movement of the non-liner label web when the second sensor issues the stop signal.

2. The label peeling machine according to claim 1, wherein the carrier belt is formed into a substantially endless right-angled triangular shape including a first portion disposed along the first path portion of the carrier belt path from the first driven shaft to the second driven shaft, and a second portion disposed along the second path portion of the carrier belt path from the third driven shaft to the first driven shaft, the peeling claw includes a curved surface facing an outer periphery of a bent portion of the carrier belt bent in response to the first driven shaft at a lower end portion of the peeling claw and an edge portion at an acute angle formed at a distal end of the curved surface.

3. The label peeling machine according to claim 1, wherein the transmitting mechanism is a drive belt or a drive gear.

4. The label peeling machine according to claim 1, further comprising a small roller configured to press the non-liner label web in the first direction and a reverse moving roller configured to rotate in contact with the small roller and guide the peeled adhesive label in the backward motion along the first path portion in the vicinity of the peeling claw.

5. The label peeling machine according to claim 1, wherein the first sensor and the second sensor include adjusters having adjusting bolts for adjusting positions thereof, respectively.

* * * * *